3,420,762
ELECTROCOATING PROCESS WITH PRETREATMENT OF ARTICLES
Richard Elliott Shaw, Windsor, and James Phillip Wiltshire, Berkhampstead, England, assignors to Imperial Chemical Industries Limited, London, England, a corporation of Great Britain
No Drawing. Filed Jan. 18, 1965, Ser. No. 426,411
Claims priority, application Great Britain, Jan. 24, 1964, 3,203/64, 3,204/64
U.S. Cl. 204—181         7 Claims
Int. Cl. C23b *13/00;* C23f *17/00*

ABSTRACT OF THE DISCLOSURE

A process of coating metal articles with an organic film-forming material, for example, paint, of the type in which the coating is electro-deposited by immersing the articles in an aqueous coating composition containing the organic film-forming material and passing an electric current through the coating composition between the article and another electrode. The articles are cleaned and rinsed with water prior to coating, and the water-wet articles are treated with aqueous coating composition to displace any water thereon prior to commencement of electro-deposition.

---

This invention relates to processes of coating metal articles with an organic film-forming material, for example, paint, in which the coating is electro-deposited by immersing the articles in an aqueous coating composition containing the organic film-forming material, which may or may not be pigmented, and passing an electric current through the coating composition between the article and another electrode. In such an electro-deposition process the articles are usually connected to the electric current supply and then immersed in the coating composition whereupon current flows through the composition and a coating of coagulated film-forming material is deposited on the surface of the articles.

Metal articles which are to be painted, are generally first thoroughly cleaned and degreased, for example, by treatment with an aqueous alkaline solution, and frequently this is followed by an inorganic coating process, for example, a treatment with an aqueous phosphating or chromating solution. The articles are then rinsed with water and, when a conventional coating composition based on organic solvents is to be used, the resulting water-wet articles are finally dried by heating and then cooled before the coating composition is applied.

With the advent of coating compositions based on water-borne organic film-forming material, there arises the possibility of dispensing with this last preliminary step of drying and cooling. We have found, however, that the film of water on the rinsed articles does not diffuse into the aqueous coating composition very rapidly, with the result that when water-wet articles are coated by an electo-deposition process, the coating is patchy, being rough or thin in areas due to localised effect of the water carried on the surface of the article.

We have now found that smoother coatings on water-wet metal articles can be obtained by electro-deposition processes if the articles are treated with aqueous coating composition to displace any water thereon prior to commencement of electro-deposition.

The treatment may take the form of a preliminary rinse by immersion of the articles in a bath of aqueous coating composition separate from the main coating bath or by subjecting the articles to jets, sprays, or a "curtain" of aqueous coating composition so that the surface is thereby washed down and any film or droplets of water are rinsed away. The coating composition used in this way may be re-circulated but if so, its tendency to become diluted by the water displaced from the articles should be counter-balanced by addition of concentrated coating composition. In this way, the composition of the rinse material can be maintained substantially similar to that of the coating composition in the main coating bath.

Preferably, the viscosity of the rinse material is less than 30 centipoises at 25° C. and, better still, less than 20 centipoises at 25° C.

The rinsed articles may then be immersed in the main bath of aqueous coating composition and even if the articles are connected to the electric current supply prior to immersion there is a diminution or elimination of patchiness in the coating as compared with that on non-rinsed articles.

Alternatively, if the aqueous coating composition has a viscosity of less than 30 centipoises at 25° C. the water-wet articles may be treated by immersion in the main coating composition for a period of at least 10 seconds, and preferably at least 15 seconds, before the coating current is passed and electro-deposition commences.

Preferably, the viscosity of the coating composition used in this process is less than 20 centipoises at 25° C.

In one embodiment of the invention a series of water-wet metal articles was carried by conveyor into a coating bath of aqueous coating composition based on a dispersion in water of a pigmented alkyd stabilised by ammonia. The viscosity of the composition was 15 centipoises at 25° C. After 10 seconds in the bath, the articles were connected to the electric current supply for a period of 60 seconds. At the end of this time the articles were carried out of the bath, allowed to drain for 30 seconds and then stoved for 15 minutes at 200° C. The coated articles showed no sign of the patchiness apparent on articles coated by a process in which there was no preliminary immersion in the bath.

The process of this invention may be applied to electro-deposition from aqueous coating compositions based on other organic film-forming materials such as ammoniated maleinised oils, water-soluble vinyl polymers and acid salts of polyamide resins.

We claim:
1. A process of coating water-wet metal articles with organic film-forming material by electro-deposition from an aqueous coating composition containing the material, the articles being treated with aqueous coating composition for at least ten seconds to displace water thereon prior to commencement of electro-deposition whereby drying of the water-wet articles before electro-deposition can be omitted.

2. A process as claimed in claim 1 in which the viscosity of the coating composition by which the water is displaced is less than 30 centipoises at 25° C.

3. A process as claimed in claim 2 in which the viscosity of the coating composition by which the water is displaced is less than 20 centipoises at 25° C.

4. A process as claimed in claim 1 in which the period of immersion before commencement of electro-deposition is at least 15 seconds.

5. A process of coating water-wet metal articles with organic film-forming material by electro-deposition from an aqueous coating composition containing the material, the articles being treated with aqueous coating composition to displace water thereon prior to commencement of electro-deposition whereby drying of the water-wet articles before electro-deposition can be omitted, the articles being treated by rinsing with aqueous coating composition prior to immersion in a bath of aqueous coating composition in which the electro-deposition is carried out.

6. A process as claimed in claim 5 in which the viscosity of the coating composition by which the water is displaced is less than 30 centipoises at 25° C.

7. A process as claimed in claim 6 in which the viscosity of the coating composition by which the water is displaced is less than 20 centipoises at 25° C.

References Cited
UNITED STATES PATENTS

| | | | |
|---|---|---|---|
| 1,589,327 | 6/1926 | Eberlin et al. | 204—181 |
| 3,200,057 | 8/1965 | Burnside et al. | 204—181 |
| 3,304,250 | 2/1967 | Gilchrist | 204—181 |

JOHN H. MACK, *Primary Examiner.*

E. ZAGARELLA, *Assistant Examiner.*

U.S. Cl. X.R.

204—29